United States Patent
Park et al.

(10) Patent No.: US 9,307,471 B1
(45) Date of Patent: Apr. 5, 2016

(54) SELECTING AN ACCESS NODE FOR WIRELESS DEVICE COMMUNICATION

(71) Applicant: Sprint Spectrum LP, Overland Park, KS (US)

(72) Inventors: Sungki Park, Ashburn, VA (US); Brent A. Scott, Gardner, KS (US); Jasinder P. Singh, Olathe, KS (US); Brett Christian, Independence, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 178 days.

(21) Appl. No.: 14/072,665

(22) Filed: Nov. 5, 2013

(51) Int. Cl.
*H04W 36/22* (2009.01)
*H04W 36/00* (2009.01)
*H04W 28/08* (2009.01)
*H04W 36/08* (2009.01)

(52) U.S. Cl.
CPC .............. *H04W 36/22* (2013.01); *H04W 28/08* (2013.01); *H04W 36/00* (2013.01); *H04W 36/0022* (2013.01); *H04W 36/0055* (2013.01); *H04W 36/0061* (2013.01); *H04W 36/0066* (2013.01); *H04W 36/0083* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 7,185,067 B1 | 2/2007 | Viswanath et al. | |
| 2004/0162072 A1* | 8/2004 | Sigle et al. | 455/436 |
| 2008/0089291 A1* | 4/2008 | Song | H04W 36/08 370/331 |
| 2009/0233604 A1 | 9/2009 | Sayeedi | |
| 2010/0027507 A1* | 2/2010 | Li et al. | 370/331 |
| 2011/0081887 A1* | 4/2011 | Chakraborty | H04W 48/02 455/410 |
| 2012/0149378 A1* | 6/2012 | Li | H04W 36/0055 455/438 |
| 2013/0130688 A1* | 5/2013 | Chin | H04W 36/22 455/436 |
| 2014/0038605 A1* | 2/2014 | Behnamfar et al. | 455/436 |
| 2014/0038616 A1* | 2/2014 | Burbidge et al. | 455/442 |
| 2014/0226621 A1* | 8/2014 | Choi et al. | 370/331 |
| 2015/0156686 A1* | 6/2015 | Kikuchi | 455/436 |

* cited by examiner

*Primary Examiner* — Habte Mered

(57) ABSTRACT

In systems and methods of selecting an access node for wireless device communication, it is determined that a first loading of a first access node meets a first loading criteria, and a wireless device is selected which is in communication with the first access node and which detects a second access node. A request is sent to the second access node to accept a handover of the wireless device, and a timer is started comprising a first timer value when the request is rejected by the second access node. A second request is sent to the second access node to accept a handover of the wireless device to the second access node when the timer expires, and the wireless device is instructed to change from communicating with the first access node to communicating with the second access node when the second request is accepted by the second access node.

19 Claims, 6 Drawing Sheets

SELECTING AN ACCESS NODE FOR WIRELESS DEVICE COMMUNICATION

TECHNICAL BACKGROUND

As a number of wireless devices in communication with an access node increases, demand for communication link resources to provide communication services increases. The communication services can include interconnect or dispatch voice communications, as well as other data communications including streaming video and audio services, Internet access, and the like. The demand for communication link resources can be adjusted by managing the loading of communication links between wireless devices and access nodes. Some communication systems enable access nodes to exchange information about wireless communication link loading over communication links among the access nodes. However, cases can arise where certain access nodes do not share loading information, and load management decisions must be made without the benefit of such access node loading information.

OVERVIEW

In an embodiment, it is determined that a first loading of a first access node meets a first loading criteria. A wireless device in communication with the first access node and which detects a second access node is selected, and a request is sent to the second access node to accept a handover of the wireless device. A timer is started comprising a first timer value when the request is rejected by the second access node, and when the timer expires a second request is sent to the second access node to accept a handover of the wireless device to the second access node. When the second request is accepted by the second access node, the wireless device is instructed to change from communicating with the first access node to communicating with the second access node.

DETAILED DESCRIPTION

Figure 1:
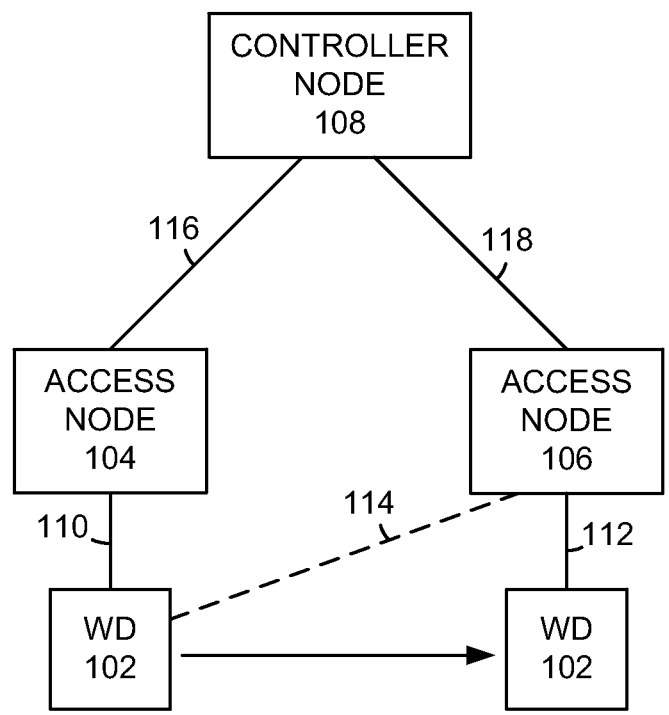
FIG. 1 illustrates an exemplary communication system for selecting an access node for wireless device communication.

FIG. 1 illustrates an exemplary communication system 100 for selecting an access node for wireless device communication comprising wireless device 102, access node 104, access node 106, and controller node 108. Examples of wireless device 102 can comprise a cell phone, a smart phone, a computing platform such as a laptop, palmtop, or tablet, a personal digital assistant, or an internet access device, including combinations of the foregoing. Wireless device 102 can communicate with access node 104 over communication link 110 and with access node 106 over communication link 112. Wireless device 102 can also detect access node 106 over communication link 114, which can comprise a pilot signal or similar information transmitted by access node 106.

Access nodes 104 and 106 are each a network node capable of providing wireless communications to wireless device 102, and can be, for example, a base transceiver station, a radio base station, an eNodeB device, or an enhanced eNodeB device. Access node 104 is in communication with controller node 108 over communication link 116, and access node 106 is in communication with controller node 108 over communication link 118.

Controller node 108 can comprise can comprise a processor and associated circuitry to execute or direct the execution of computer-readable instructions, and can be configured to maintain network connection information associated with wireless device 102. Controller node 108 can control the setup and maintenance of a communication session a communication network by wireless device 102. Controller node 108 can comprise a mobile switching center (MSC), a dispatch call controller (DCC), a mobility management entity (MME), or other similar network node. Controller node 108 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations of the foregoing. Controller node 108 can receive instructions and other input at a user interface.

Communication links 110, 112, 114, 116 and 118 can be wired or wireless communication links. Wired communication links can comprise, for example, twisted pair cable, coaxial cable or fiber optic cable, or combinations of the foregoing. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations of the foregoing. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

A demand for communication link resources at an access node can be adjusted by managing the loading of communication links between wireless devices and access nodes. Some communication systems enable access nodes to exchange information about wireless communication link loading over communication links among the access nodes. However, cases can arise where certain access nodes do not share loading information, and load management decisions must be made without the benefit of such access node loading information.

In operation, it is determined that a loading of access node 104 meets a first loading criteria. Wireless device 102 is selected, wherein wireless device 102 is in communication with access node 104 and detects access node 106. A request is sent to access node 106 to accept a handover of wireless device 102. When the request is rejected by the second access node, a timer comprising a first timer value is started. The timer can be started at access node 104, or it can be started at controller node 108. When the timer expires, a second request is sent to access node 106 to accept a handover of wireless device 102. When the second request is accepted by access node 106, wireless device 102 is instructed to change from communicating with access node 104 to communicating with access node 106.

Figure 2:
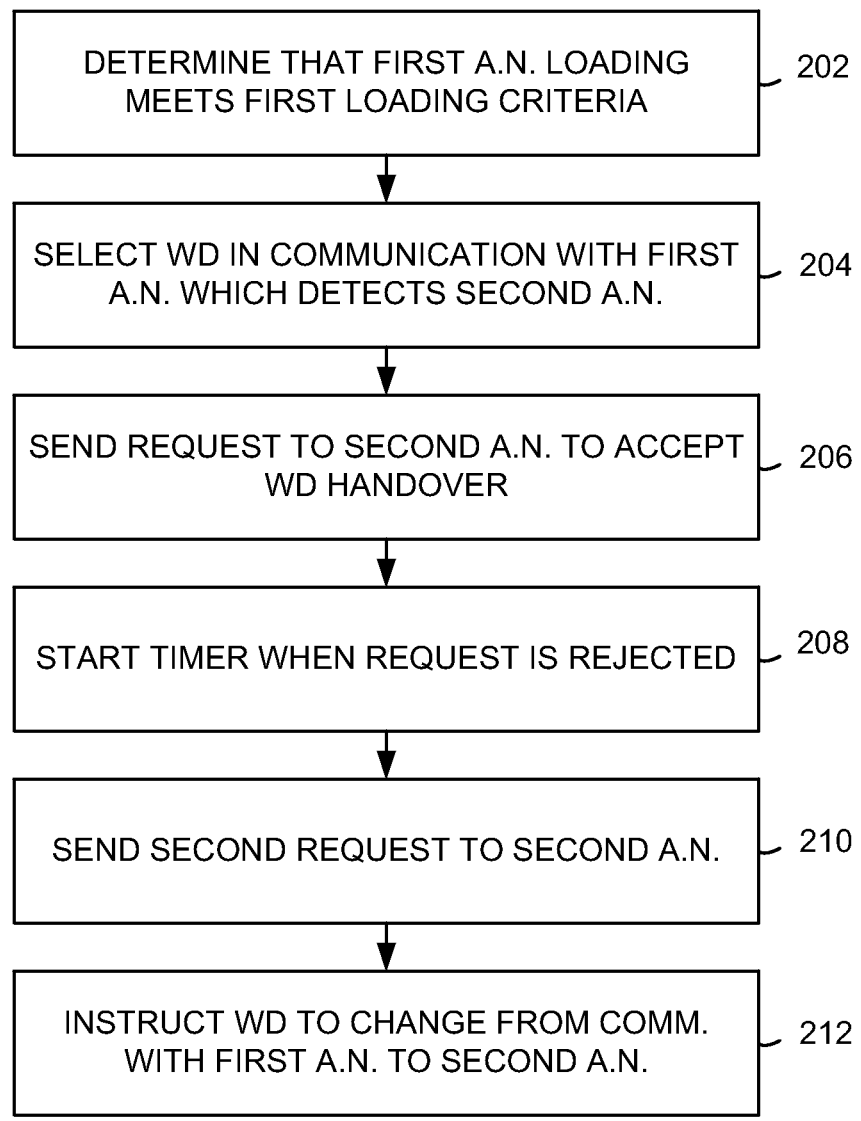
FIG. 2 illustrates an exemplary method of selecting an access node for wireless device communication.

FIG. 2 illustrates an exemplary method of selecting an access node for wireless device communication. In operation 202, it is determined that a first loading of a first access node meets a first loading criteria. For example, it can be determined that a loading of access node 104 meets a loading criteria. The loading can comprise an amount of data carried over communication links of access node 104, or requests for data to be carried over communication links of access node 104 (as may be determined from buffer status reports or similar requests for communication resources), or a level of congestion on wireless communication links of access node 104, or a level of backhaul congestion between access node 104 and a communication network, or a number of wireless devices in communication with access node 104, and the like. Other examples of loading are also possible, including combinations of the foregoing. As one example, a criteria can be met when the criteria is greater than or equal to a threshold, such as a threshold level of data carried over communication links of access node 104, a threshold level of data requested to be carried over communication links of access node 104, and the like.

Next, a wireless device is selected which is in communication with the first access node and which detects a second access node (operation 204). For example, wireless device 102 can be selected when it is in communication with access node 104 and when it can detect a signal of second access node 106 as a candidate for a handover to access node 106. When a wireless device is selected, a request is sent to the second access node to accept a handover of the wireless device (operation 206). For example, access node 104 can send a request to access node 106 through controller node 108 to accept a handover of wireless device 102. The request can be initiated by access node 104, or the request can be initiated by controller node 108 when controller node determines that a first loading of access node 104 meets a first loading criteria.

In an embodiment, the first access node does not receive second access node loading information from the second access node. For example, access node 104 may not receive loading information from access node 106. This may occur when a communication link between the access nodes is not present, or when a communication link is malfunctioning even when it is present. Further, access node 106 may also not be configured to provide loading information to access node 104 and/or controller node 108. In addition, access node 106 may be configured to provide its loading information, but may do so in a format or protocol which is incomprehensible to access node 104 and/or controller node 108. Other reasons why loading information of access node 106 may not be available are also possible, including combinations of the foregoing.

The second access node may reject the request to accept the handover of wireless device 102. When the request is rejected by the second access node, a timer is started comprising a first timer value (operation 208). For example, access node 106 may reject the request to accept a handover of wireless device 102. Access node 106 may reject the request because of an amount of data carried over communication links of access node 106, or requests for data to be carried over communication links of access node 106 (as may be determined from buffer status reports or similar requests for communication resources), or a level of congestion on wireless communication links of access node 106, or a level of backhaul congestion between access node 106 and a communication network, or a number of wireless devices in communication with access node 106, and the like. Other reasons are also possible, including combinations of the foregoing. Access node 106 may or may not provide information indicating the reason for rejecting the request. While the timer is running, no further requests are sent to access node 106 to accept a handover of wireless device 102. The timer can run at access node 104 or at controller node 108.

When the timer expires, a second request is sent to the second access node to accept a handover of the wireless device (operation 210). The second request can be initiated by access node 104 or by controller node 108. When the second request is received by access node 106 it may be accepted, for example, because of a change in one or more of the conditions described above. When the second request to accept a handover of the wireless device is accepted by the second access node, the wireless device is instructed to change from communicating with the first access node to communicating with the second access node (operation 212). For example, when the second request is accepted by second access node 106, wireless device 102 is instructed to change from communicating with access node 104 to communicating with access node 106.

Figure 3:
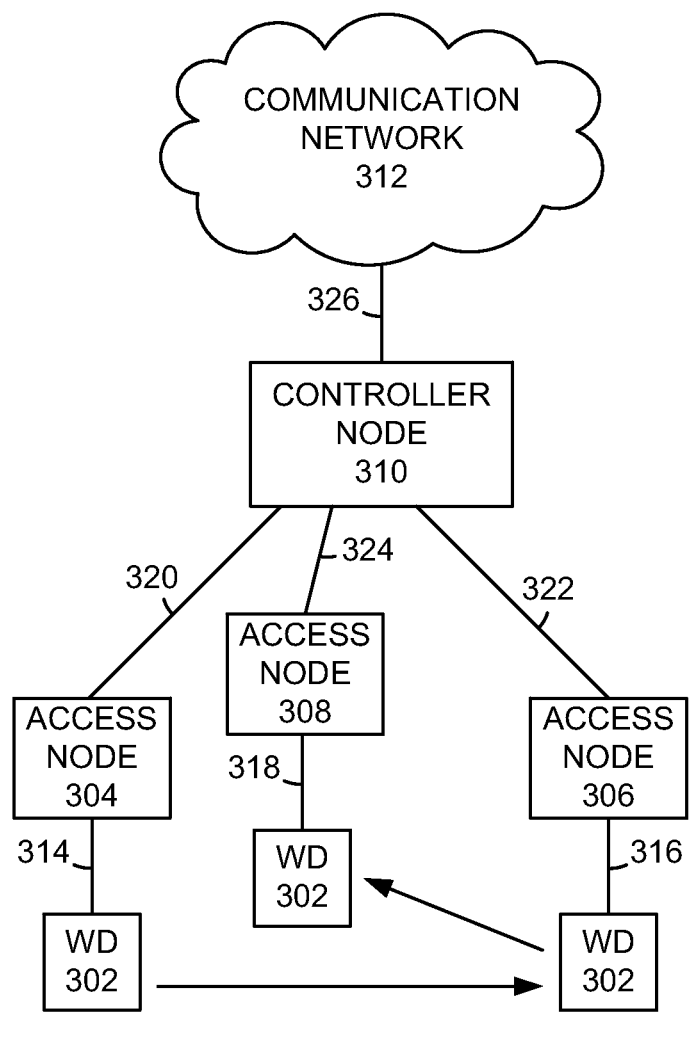
FIG. 3 illustrates another exemplary communication system for selecting an access node for wireless device communication.

FIG. 3 illustrates another exemplary communication system 300 for selecting an access node for wireless device communication comprising wireless device 302, access node 304, access node 306, access node 308, controller node 310, and communication network 312. Examples of wireless device 302 can comprise a cell phone, a smart phone, a computing platform such as a laptop, palmtop, or tablet, a personal digital assistant, or an internet access device, including combinations of the foregoing. Wireless device 302 can communicate with access node 304 over communication link 314, with access node 306 over communication link 316, and with access node 308 over communication link 318. When wireless device 302 is in communication with one access node, wireless device 302 may be able to detect one or more other access nodes. For example, when wireless device 302 is in communication with access node 304, wireless device 302 may be able to detect access node 306 and/or access node 308. Similarly, when wireless device 102 is in communication with access node 306, wireless device 302 may be able to detect access node 308 and/or access node 304.

Access nodes 304, 306 and 308 are each a network node capable of providing wireless communications to wireless device 302, and can be, for example, a base transceiver station, a radio base station, an eNodeB device, or an enhanced eNodeB device. Access node 304 is in communication with controller node 310 over communication link 320, access node 306 is in communication with controller node 310 over communication link 322, and access node 308 is in communication with controller node 310 over communication link 324. In an embodiment, access nodes can be associated with different communication networks. For example, access node 304 can be associated with a first communication network, and access node 306 can be associated with a second communication network. Similarly, access node 308 can be associated with the first communication network, or with the second communication network.

Controller node 310 can comprise a processor and associated circuitry to execute or direct the execution of computer-readable instructions, and can be configured to maintain network connection information associated with wireless device 302. Controller node 310 can control the setup and maintenance of a communication session a communication network by wireless device 302. Controller node 310 can comprise a mobile switching center (MSC), a dispatch call controller (DCC), a mobility management entity (MME) or another similar network node. Controller node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations of the foregoing. Controller node 310 can receive instructions and other input at a user interface. Controller node is in communication with communication network 312 over communication link 326.

Communication network 312 can be a wired and/or wireless communication network, and can comprise processing nodes, routers, gateways, and physical and/or wireless data links for carrying data among various network elements, including combinations of the foregoing, and can include a local area network, a wide area network, and an internetwork (including the Internet). Communication network 312 can be capable of carrying voice information and other data, for example, to support communications by a wireless device such as wireless device 302. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 may also comprise a wireless network, including base stations, wireless communication nodes, telephony switches, internet routers, network gateways, computer systems, communication links, or some other type of communication equipment, and combinations of the foregoing.

Communication links 314, 316, 318, 320, 322, 324, and 326 can be wired or wireless communication links. Wired communication links can comprise, for example, twisted pair cable, coaxial cable or fiber optic cable, or combinations of the foregoing. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations of the foregoing. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304, 306 and 308, controller node 310 and communication network 312 which are omitted for clarity, including additional processing nodes, routers, gateways, and physical and/or wireless data links for carrying data among the various network elements.

Figure 4:
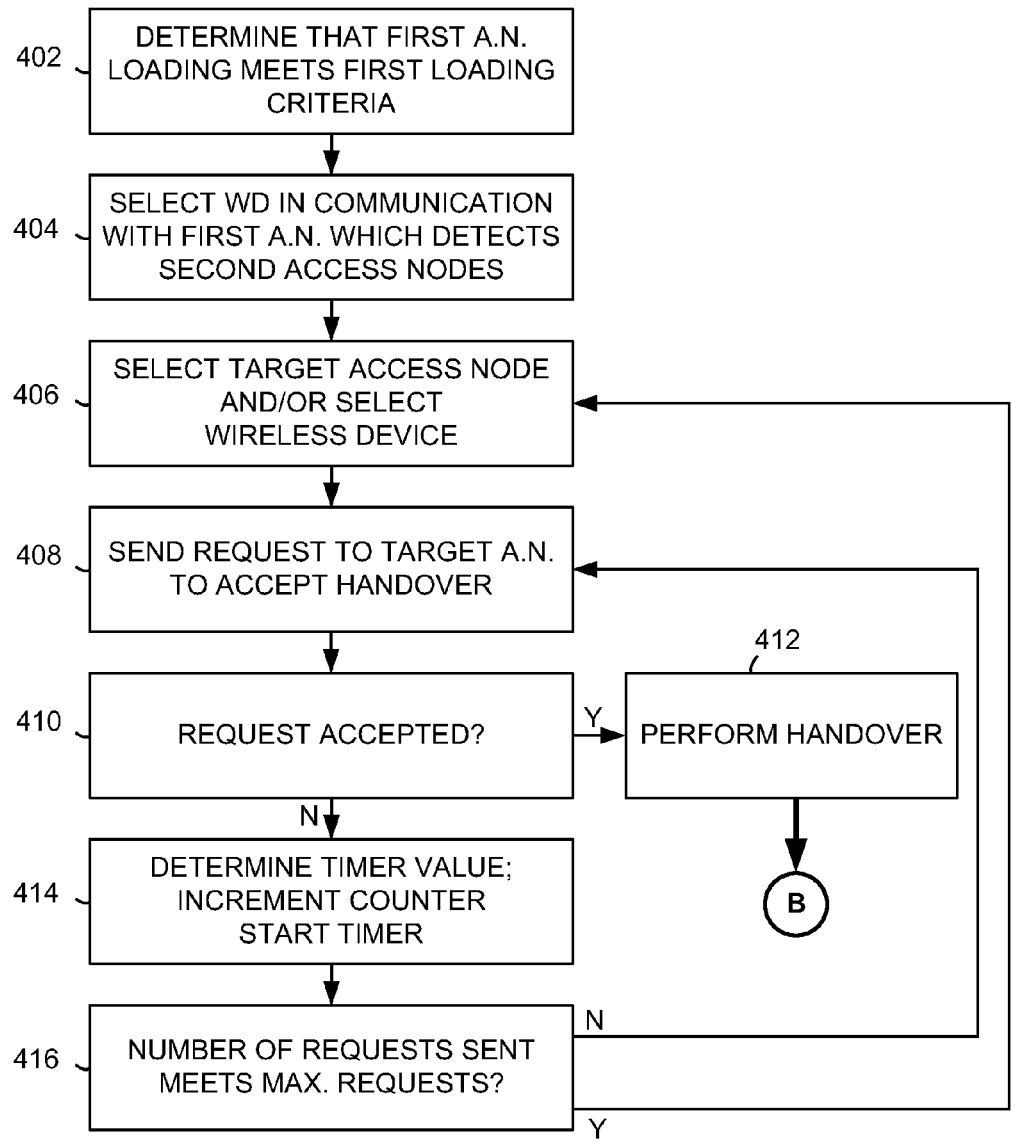
FIG. 4 illustrates another exemplary method of selecting an access node for wireless device communication.

FIG. 4 illustrates another exemplary method of selecting an access node for wireless device communication. In operation 402, it is determined that a first loading of a first access node meets a first loading criteria. For example, it can be determined that a loading of access node 304 meets a loading criteria. The loading can comprise an amount of data carried over communication links of access node 304, or requests for data to be carried over communication links of access node 304 (as may be determined from buffer status reports or similar requests for communication resources), or a level of congestion on wireless communication links of access node 304, or a level of backhaul congestion between access node 304 and a communication network, or a number of wireless devices in communication with access node 304, and the like. Other examples of loading are also possible, including combinations of the foregoing. As one example, a criteria can be met when the criteria is greater than or equal to a threshold, such as a threshold level of data carrier over communication links of access node 304, a threshold level of data requested to be carried over communication links of access node 304, and the like.

Next, a target access node is selected, and a wireless device which is in communication with the first access node and which detects the target second access node are selected (operation 406). For example, wireless device 302 may detect access nodes 306 and 308. A target (second) access node can be selected which comprises a highest signal level detected at the wireless device from among a plurality of access nodes. For example, wireless device 302 may detect that access node 306 has the highest signal level among detectable second access nodes. A signal level can comprise a signal strength (such as a signal to noise ratio, a signal to interference plus noise ratio, a reference signal receive power, a received signal strength indicator, and the like), a signal quality (such as a reference signal receive quality, a channel quality indicator, and the like), or another indication of signal level. Based on the signal level detected at wireless device 302, access node 306 can be selected as a target second access node. In an embodiment, access node 304 is associated with a first communication network, and access node 306 is associated with a second communication network.

Further, wireless device 302 can be selected as a candidate for a handover when it is in communication with access node 304 and when it can detect a signal of second access node 306 and/or of access node 308. Where more than one wireless device is in communication with access node 304, a wireless device can be selected which detects a highest signal level of a second access node, as compared to signal levels of second access nodes received by other wireless devices in communication with access node 304.

When a wireless device and a second access node are selected, a first request is sent to the second access node to accept a handover of the wireless device (operation 408). For example, access node 304 can send a first request to access node 306 through controller node 310 to accept a handover of wireless device 302. The first request can be initiated by access node 304, or the request can be initiated by controller node 310 when controller node determines that a first loading of access node 304 meets a first loading criteria. The first request can comprise an indication of a reason for which the handover is requested. In an embodiment, the handover request comprises an information element indicating a reason for requesting the handover, such as a "with cause" information element.

In an embodiment, the first access node does not receive second access node loading information from the second access node. For example, access node 304 may not receive loading information from access node 306. This may occur when a communication link between the access nodes is not present, or when a communication link is malfunctioning even when it is present. Further, access node 306 may also not be configured to provide loading information to access node 304 and/or controller node 310. Additionally, access node 306 may be configured to provide its loading information, but may do so in a format or protocol which is incomprehensible to access node 304 and/or controller node 310. Other reasons why loading information of access node 306 are also possible, including combinations of the foregoing.

The second access node may accept or reject the first request to accept the handover of wireless device 302. When the first request is accepted (operation 410—Y), the wireless device is instructed to change from communicating with the first access node to communicating with the second access node (operation 412). When the first request is rejected by the second access node (operation 410—N), a first timer value is determined, a counter is incremented, and a timer is started using the first timer value (operation 414). The counter comprises a number of requests sent to access node 306 to accept a handover of wireless device 302.

Access node 306 may reject the first request because of an amount of data carried over communication links of access node 306, or requests for data to be carried over communication links of access node 306 (as may be determined from buffer status reports or similar requests for communication resources), or a level of congestion on wireless communication links of access node 306, or a level of backhaul congestion between access node 306 and a communication network, or a number of wireless devices in communication with access node 306, and the like. Other reasons are also possible, including combinations of the foregoing. Access node 306 may or may not provide information indicating the reason for rejecting the first request. While the first timer is running, no further requests are sent to access node 306 to accept a handover of wireless device 302 from access node 304. The timer can run at access node 304 or at controller node 310.

When the first timer expires, it is determined whether the counter meets a threshold number of requests (operation 416). When the counter meets the threshold number of requests (operation 416—Y), then a new target access node and/or wireless device handover candidate are selected. When the counter does not meet the threshold number of requests (operation 416—N), a second request is sent to the second access node to accept a handover of the wireless device (operation 408). The second request can be initiated by access node 304 or by controller node 310. When the second request is received by access node 306, it may be accepted, for example, because of a change in one or more of the conditions described above, and when the second request to accept a handover of the wireless device is accepted by the second access node, the wireless device is instructed to change from communicating with the first access node to communicating with the second access node (operation 412).

When the second request is not accepted (operation 410—N), the counter is incremented, a second timer value is determined, and a second timer is started using the second timer value (operation 414). The second timer value can be based on the first timer value and the incremented counter value. In an embodiment, based on the first timer value, the wireless device may be instructed to provide additional or updated signal level information about the second access node. For example, when the first timer value meets or exceeds a threshold timer value, wireless device 302 can be instructed (by access node 304, or by controller node 310) to provide updated signal level information about access node 306. In such case, the second timer value can be based on the first timer value, the incremented counter value, and the updated signal level information about access node 306 (the second access node).

When the second timer expires, it is determined whether the counter meets the threshold number of requests (operation 416). When the counter meets the threshold number of requests (operation 416—Y), then a new target access node and/or wireless device handover candidate are selected. When the counter does not meet the threshold number of requests (operation 416—N), a third request is sent to the second access node to accept a handover of the wireless device (operation 408). That is, a third request can be sent to the second access node to accept a handover of the wireless device to the second access node when the second timer expires and when a number of requests sent meets a maximum request criteria. In an embodiment, the maximum request criteria can be met when the counter does not meet a maximum permitted number of handover requests. The third request can be initiated by access node 304 or by controller node 310. When the third request is received by access node 306, it may be accepted, for example, because of a change in one or more of the conditions described above, and when the third request to accept a handover of the wireless device is accepted by the second access node, the wireless device is instructed to change from communicating with the first access node to communicating with the second access node (operation 412). Thus, a determination about whether to perform a handover of a wireless device from access node 304 to access node 306 can be made without receiving loading information of access node 306. Further, unless expressly instructed as described above, wireless devices are not instructed to perform additional signal level measurements, to reduce utilization of stored power and processor resources of the wireless devices.

Figure 5:
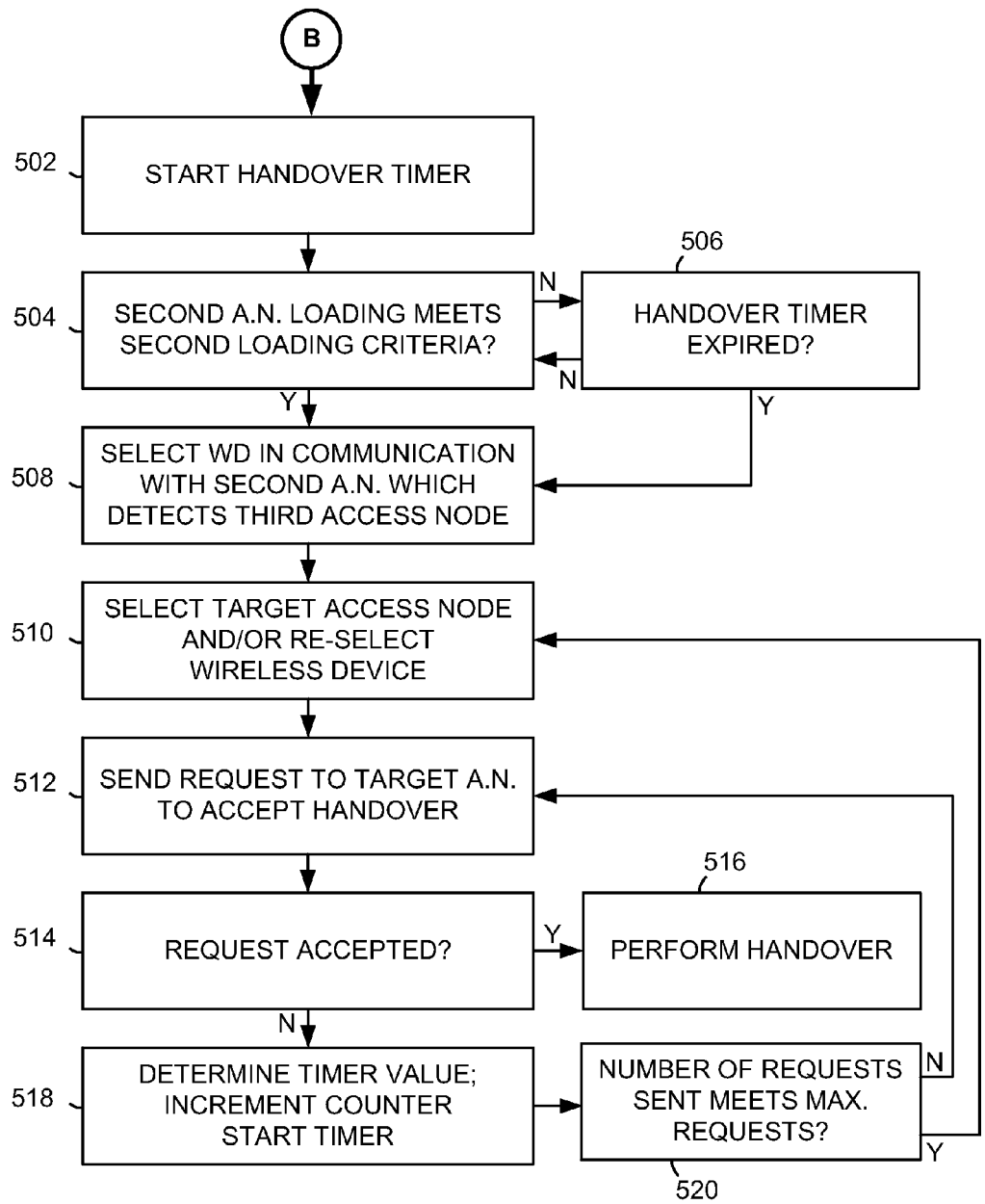
FIG. 5 illustrates another exemplary method of selecting an access node for wireless device.

FIG. 5 illustrates another exemplary method of selecting an access node for wireless device. Where wireless device 302, access node 304 and access node 306 are associated with a first communication system, and access node 306 is associated with a second communication system, the first communication system may attempt to reclaim wireless device 302 by instructing the wireless device to resume communication through an access node associated with the first communication system. When wireless device 302 is instructed to change from communicating with access node 304 (associated with the first communication system) to communicating with access node 306 (associated with the second first communication system), a handover timer is started (operation 502). In addition, a loading of access node 306 can be monitored. The loading of access node 306 can comprise an amount of data carried over communication links of access node 306, or requests for data to be carried over communication links of access node 306 (as may be determined from buffer status reports or similar requests for communication resources), or a level of congestion on wireless communication links of access node 306, or a level of backhaul congestion between access node 306 and a communication network, or a number of wireless devices in communication with access node 306, and the like. Other examples of loading are also possible, including combinations of the foregoing.

In operation 504, it is determined whether the second loading meets a second loading criteria. As one example, the second loading criteria can be met when the criteria is greater than or equal to a threshold, such as a threshold level of data carrier over communication links of access node 306, a threshold level of data requested to be carried over communication links of access node 306, and the like. When the loading of the second access node does not meet the second loading criteria (operation 504—N), it is determined whether the handover timer has expired (operation 506).

When the loading of the second access node meets the second loading criteria (operation 504—Y), or when the handover timer has expired (operation 506—Y), then a wireless device is selected which is in communication with the second access node and which detects a third access node (operation 508). For example, wireless device 302, now in communication with access node 306 over communication link 316, may detect access nodes 304 and 308. Wireless device 302 can be selected as a candidate for a handover when it is in communication with access node 306 and when it can detect a signal of second access node 304 and/or of access node 308. Where more than one wireless device is in communication with access node 306, a wireless device can be selected which detects a highest signal level of a second access node, as compared to signal levels of second access nodes received by other wireless devices in communication with access node 306.

Next, a target access node is selected as a candidate to receive a handover of the selected wireless device (operation 510). A target access node can be selected which comprises a highest signal level detected at the wireless device from among a plurality of access nodes. For example, wireless device 302 may detect that access node 308 has the highest signal level among detectable second access nodes. Based on the signal level detected at wireless device 302, access node 308 can be selected as a target access node. In an embodiment, access node 308 is associated with the first communication network, as can be determined by an identifier sent from access node 308 such as a public land mobile network (PLMN) ID or another network identifier. In addition to the detected signal level, the network identifier can be used to determine which target access node to select. For example, when wireless device 302 is associated with the first communication network and access node 306 can be associated with a second network, preference or priority can be applied to access nodes associated with the first communication network.

In an embodiment, the second (serving) access node does not receive third (target) access node loading information from the third access node. For example, access node 306 may not receive loading information from access node 308. This may occur when a communication link between the access nodes is not present, or when a communication link is malfunctioning even when it is present. In addition, access node 306 may not be configured to receive loading information from access node 308 and/or controller node 312. Further, access node 306 may be configured to receive loading information, but may not understand a format or protocol of the information from access node 308 and/or controller node 310. Other reasons are also possible, including combinations of the foregoing.

When a wireless device and a third access node are selected, a request is sent to the third access node to accept a handover of the wireless device (operation 512). For example, access node 306 can send a request to access node 308 through controller node 310 to accept a handover of wireless device 302. The request can be initiated by access node 306, or the request can be initiated by controller node 310 when controller node determines that the second loading of access node 306 meets the second loading criteria. The request can comprise an indication of a reason for which the handover is requested. In an embodiment, the handover request comprises an information element indicating a reason for requesting the handover, such as a "with cause" information element. The information element can indicate that access node 306 needs to reduce its loading, even in a situation where that is not true. For example, when the handover timer has expired, even when the loading of access node 306 does not meet the second loading criteria, access node 306 can send a request to access node 308 to accept a handover of wireless device 302.

The third access node may accept or reject the request to accept the handover of wireless device 302. When the request is accepted (operation 514—Y), the wireless device is instructed to change from communicating with the second access node to communicating with the third access node (operation 516). When the request is rejected by the second access node (operation 514—N), a timer value is determined, a counter is incremented, and a timer is started using the timer value (operation 414). The counter comprises a number of requests sent to access node 308 to accept a handover of wireless device 302 from access node 306.

Access node 308 may reject the request because of an amount of data carried over communication links of access node 308, or requests for data to be carried over communication links of access node 308 (as may be determined from buffer status reports or similar requests for communication resources), or a level of congestion on wireless communication links of access node 308, or a level of backhaul congestion between access node 308 and communication network 312, or a number of wireless devices in communication with access node 308, and the like. Access node 308 may or may not provide information indicating the reason for rejecting the request. While the timer is running, no further requests are sent to access node 308 to accept a handover of wireless device 302 from access node 306. The timer can run at access node 306 or at controller node 310.

When the timer expires, it is determined whether the counter meets a threshold number of requests (operation 520). When the counter meets the threshold number of requests (operation 520—Y), then a new target access node and/or wireless device handover candidate are selected (operation 510). When the counter does not meet the threshold number of requests (operation 520—N), a second request is sent to the third access node to accept a handover of the wireless device (operation 512). The second request can be initiated by access node 304 or by controller node 310. When the second request is received by access node 306, it may be accepted, for example, because of a change in one or more of the conditions described above, and when the second request to accept a handover of the wireless device is accepted by the third access node, the wireless device is instructed to change from communicating with the second access node to communicating with the second access node (operation 412).

When the second request to access node 308 is not accepted (operation 410—N), the counter is incremented, a second timer value is determined for access node 306, and a second timer is started using the second timer value (operation 414). The second timer value can be based on the previous timer value for access node 306 and the incremented counter value. In an embodiment, based on the first timer value, the wireless device may be instructed to provide additional or updated signal level information about the third access node. For example, when the first timer value determined for access node 306 meets or exceeds a threshold timer value, wireless device 302 can be instructed (by access node 306, or by controller node 310) to provide updated signal level information about access node 308. In such case, the second timer value determined for access node 306 can be based on the first timer value determined for access node 306, the incremented counter value, and the updated signal level information about access node 308 (the third access node).

When the second timer expires, it is determined whether the counter meets the threshold number of requests (operation 416). When the counter meets the threshold number of requests (operation 416—Y), then a new target access node and/or wireless device handover candidate are selected. When the counter does not meet the threshold number of requests (operation 416—N), a third request is sent to the third access node to accept a handover of the wireless device (operation 408). That is, a third request can be sent to the third access node to accept a handover of the wireless device from the second access node when the second timer determined for access node 306 expires and when a number of requests sent meets a maximum request criteria. In an embodiment, the maximum request criteria can be met when the counter does not meet a maximum permitted number of handover requests. The third request can be initiated by access node 306 or by controller node 310. When the third request is received by access node 308, it may be accepted, for example, because of a change in one or more of the conditions described above, and when the third request to accept a handover of the wireless device is accepted by the third access node, the wireless device is instructed to change from communicating with the second access node to communicating with the third access node (operation 516). Thus, loading information need not be exchanged between access node 306 and access node 308 to determine whether to perform a handover of wireless device 302. Further, unless expressly instructed as described above, wireless device 302 is not instructed to perform additional signal level measurements, to reduce utilization of stored power and processor resources of wireless device 302.

Figure 6:
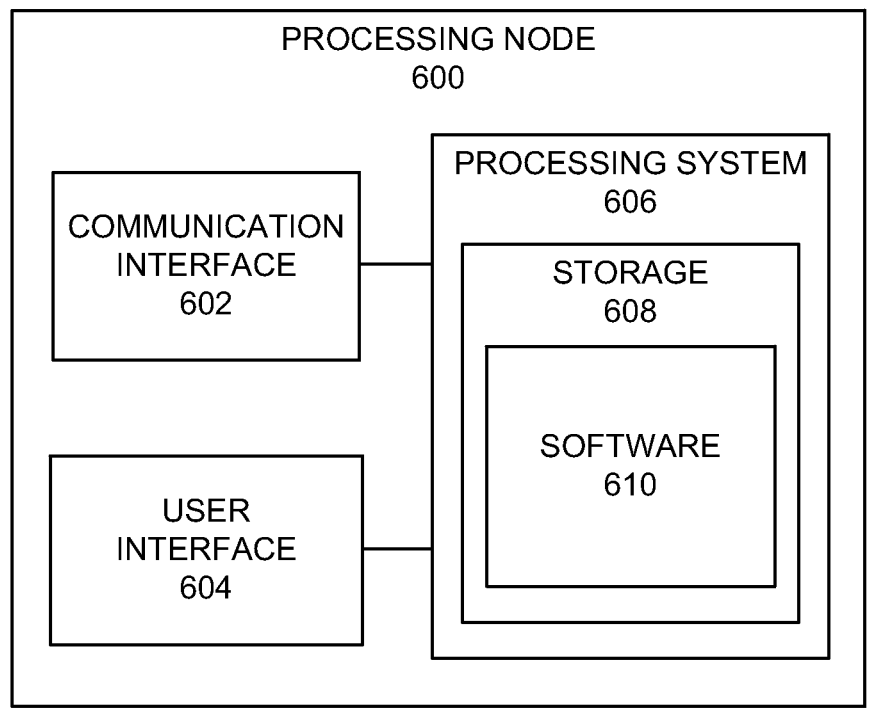
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to select an access node for wireless device communication. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, access node 106, controller node 108, access node 304, access node 306, access node 308, and controller node 310. Processing node 600 can also be an adjunct or component of a network element, such as an element of access node 104, access node 106, access node 304, or access node 306. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of selecting an access node for wireless device communication, comprising:
    determining that a first loading of a first access node meets a first loading criteria;
    selecting a first wireless device in communication with the first access node, wherein the selected first wireless device detects a first target access node for handover;
    receiving a rejection of a first request to the first target access node to accept a handover of the selected first wireless device and, on receipt of the rejection, starting a first timer for a subsequent timer value, wherein the subsequent timer value is based on an initial timer value and an incremented counter value of an initial timer;
    instructing the selected first wireless device to change from communicating with the first access node to communicating with the first target access node when the first request is accepted by the first target access node.

2. The method of claim 1, wherein the first access node does not receive first target access node loading information from the first target access node.

3. The method of claim 1, further comprising selecting the first target access node comprising a highest signal level detected at the selected first wireless device from among a plurality of access nodes.

4. The method of claim 1, wherein the first access node is associated with a first communication network and the first target access node is associated with a second communication network.

5. The method of claim 1, further comprising starting a second timer for a second timer value based on the subsequent timer value and a first timer incremented counter value when a second request for handover of the selected first wireless device to the first target access node is rejected by the first target access node.

6. The method of claim 5, further comprising incrementing a counter value while the second timer is running when the second request message is sent to the first target access node.

7. The method of claim 5, further comprising sending a third request to the first target access node to accept a handover of the selected first wireless device to the first target access node when the second timer expires and when a number of requests sent meets a maximum request criteria.

8. The method of claim 1, further comprising:
selecting a second wireless device in communication with the first target access node, wherein the selected second wireless device detects a second target access node for handover;
receiving a second rejection of a request to the second target access node to accept a handover of the selected second wireless device and, on receipt of the second rejection, starting a second timer for a second timer value;
sending a third request to the second target access node to accept a handover of the selected second wireless device to the second target access node when the second timer expires; and
instructing the selected second wireless device to change from communicating with the first target access node to communicating with the second target access node when the third request is accepted by the second target access node.

9. The method of claim 8, further comprising selecting the second wireless device when a second loading of the first target access node meets a second loading criteria.

10. The method of claim 8, further comprising:
starting a handover timer when the selected wireless device is instructed to change from communicating with the first access node to communicating with the first target access node; and
selecting the second wireless device when the handover timer expires.

11. The method of claim 10, wherein the request to the second target access node comprises an indication that a second loading of the first target access node meets a second loading criteria.

12. The method of claim 10, wherein the second loading of the first target access node does not meet the second loading criteria.

13. The method of claim 8, wherein the second target access node is associated with a same communication network as the first access node.

14. A system for selecting an access node for wireless device communication, comprising:
a processing node, configured to:
determine that a first loading of a first access node meets a first loading criteria;
select a first wireless device in communication with the first access node, wherein the selected first wireless device detects a first target access node for handover;
receive a rejection of a request to the first target access node to accept a handover of the selected first wireless device and, on receipt of the rejection, start a first timer for a subsequent timer value, wherein the subsequent timer value is based on an initial timer value and an incremented counter value of an initial timer;
instruct the selected first wireless device to change from communicating with the first access node to communicating with the first target access node when the request is accepted by the first target access node;
select a second wireless device in communication with the first target access node, wherein the selected second wireless device detects a second target access node for handover;
receive a second rejection of a request to the second target access node to accept a handover of the selected second wireless device and, on receipt of the second rejection, start a second timer for a second timer value;
send a third request to the second target access node to accept a handover of the selected second wireless device to the second target access node when the second timer expires; and
instruct the selected second wireless device to change from communicating with the first target access node to communicating with the second target access node when the third request is accepted by the second target access node.

15. The system of claim 14, further comprising selecting the second wireless device when a second loading of the first target access node meets a second loading criteria.

16. The system of claim 14, further comprising:
starting a handover timer when the selected first wireless device is instructed to change from communicating with the first access node to communicating with the first target access node; and
selecting the second wireless device when the handover timer expires.

17. The system of claim 16, wherein the request to the second target access node comprises an indication that a second loading of the first target access node meets a second loading criteria.

18. The system of claim 16, wherein the second loading of the first target access node does not meet the second loading criteria.

19. The system of claim 14, wherein the second target access node is associated with a same communication network as the first access node.

* * * * *